United States Patent
Zhang

(10) Patent No.: US 12,316,364 B2
(45) Date of Patent: May 27, 2025

(54) METHOD AND DEVICE FOR FRONT-END FILTERING FREQUENCY SELECTION FOR COMMUNICATION RECEIVER

(71) Applicant: Wuhan University, Wuhan (CN)

(72) Inventor: Tao Zhang, Wuhan (CN)

(73) Assignee: WUHAN UNIVERSITY, Wuhan (CN)

( * ) Notice: Subject to any disclaimer, the term of this patent is extended or adjusted under 35 U.S.C. 154(b) by 167 days.

(21) Appl. No.: 18/129,104

(22) Filed: Mar. 31, 2023

(65) Prior Publication Data

US 2023/0318649 A1     Oct. 5, 2023

(30) Foreign Application Priority Data

Mar. 31, 2022   (CN) .......................... 202210336890.8

(51) Int. Cl.
*H04B 1/16*          (2006.01)

(52) U.S. Cl.
CPC ................................. *H04B 1/1638* (2013.01)

(58) Field of Classification Search
CPC .. H04B 1/1638; H03H 11/0422; H03H 11/24; H03H 2011/0494
See application file for complete search history.

(56) References Cited

U.S. PATENT DOCUMENTS

| | | | |
|---|---|---|---|
| 6,429,733 B1* | 8/2002 | Pagliolo | H03H 11/0422 327/558 |
| 2005/0212604 A1* | 9/2005 | Cyr | H01L 24/49 331/16 |
| 2011/0181366 A1* | 7/2011 | Schoepf | H03L 7/06 331/1 R |
| 2011/0237214 A1* | 9/2011 | Swarts | H04W 56/0035 455/226.1 |
| 2021/0297296 A1* | 9/2021 | Syllaios | H04L 27/0014 |
| 2022/0322235 A1* | 10/2022 | Odelberg | H03F 3/195 |

* cited by examiner

*Primary Examiner* — Khanh C Tran
(74) *Attorney, Agent, or Firm* — JCIP GLOBAL INC.

(57) ABSTRACT

A method for front-end filtering frequency selection for a communication receiver is provided. The method includes: disposing a reference oscillator working at a preset frequency associated with a frequency to be received by the communication receiver, where the preset frequency and the frequency to be received can be accurately converted and expressed by a formula; and transmitting the frequency to be received to a front-end filtering frequency selector to realize accurate tuning. The frequency of the front-end filtering frequency selector is a required tuning frequency based on the device parameter relationship between the reference oscillator and the front-end filtering frequency selector.

4 Claims, 3 Drawing Sheets

METHOD AND DEVICE FOR FRONT-END FILTERING FREQUENCY SELECTION FOR COMMUNICATION RECEIVER

CROSS-REFERENCE TO RELATED APPLICATIONS

Pursuant to 35 U.S.C. § 119 and the Paris Convention Treaty, this application claims foreign priority to Chinese Patent Application No. 202210336890.8 filed Mar. 31, 2022, the contents of which, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, MA 02142.

BACKGROUND

The disclosure relates to the field of communication reception, and more particularly to a method and device for front-end filtering frequency selection for a communication receiver.

Front-end filtering frequency selection of a communication receiver plays an important role in the overall performance of the receiver. A well-designed front-end frequency selection can effectively remove unnecessary radio wave interference components and improve the signal quality and the dynamic performance of a system.

In a heterodyne or superheterodyne receiver, an LC resonant front-end frequency selection loop is generally used, and two variable capacitors or two variable capacitance diodes are generally adopted. The characteristic frequency of the LC loop and the oscillation frequency of a local oscillator are changed at the same time, the difference value (intermediate frequency) is kept constant, and then intermediate frequency signals are processed.

In recent years, some receivers adopt a high first intermediate frequency, which causes great difficulty in tuning the LC resonant loop. In addition, with the development of digital technology, many receivers adopt the technology of direct sampling or sampling after frequency conversion, and then the sampled signals are processed using a digital signal processing technology. These receivers generally adopt zero intermediate frequency or low intermediate frequency, and it is difficult to use conventional LC resonant front-end frequency selection. The two types of receivers mostly adopt a frequency selection network, the received signals are divided into several frequency bands, frequency selection is performed by a mode of combining several filters of low-pass, high-pass and band-pass, and then sampling or frequency conversion sampling is performed; and the later filtering work is mainly completed by an intermediate frequency processing part using the digital signal processing technology. The working modes have some problems, for example, because of the lack of front-end resonance frequency selection filtering, the front-end signal bandwidth may be too wide, the signals may be blocked, the dynamic performance is insufficient, and the selectivity is limited.

SUMMARY

The disclosure provides a front-end filtering frequency selection solution for accurately and rapidly regulating resonance frequency of a front-end filtering frequency selector.

According to a technical solution of the disclosure, a method for front-end filtering frequency selection for a communication receiver is provided. The method comprises: 1) disposing a reference oscillator working at a preset frequency associated with a frequency to be received by the communication receiver, where the preset frequency and the frequency to be received can be accurately converted and expressed by a formula; and 2) transmitting the frequency to be received to a front-end filtering frequency selector to realize accurate tuning; where, a frequency of the front-end filtering frequency selector is a required tuning frequency based on a device parameter relationship between the reference oscillator and the front-end filtering frequency selector.

In a class of this embodiment, the frequency of the reference oscillator is not set to be an integer fraction of the tuning frequency, to avoid frequency multiplication in a tuning loop.

In a class of this embodiment, the frequency of the reference oscillator is twice, 1.5 times or ¾ of the tuning frequency.

In another aspect, the disclosure provides a device for front-end filtering frequency selection for a communication receiver, comprising: a front-end frequency selection unit and a receiver; the receiver comprises a control unit and a low noise amplifier; the front-end frequency selection unit comprises a frequency synthesizing unit and a tuner LC loop; the frequency synthesizing unit is connected to the control unit through a data interface; and a radio frequency output signal of the tuner LC loop is connected to the low noise amplifier through a radio frequency signal channel.

In a class of this embodiment, the front-end frequency selection unit further comprises a reference oscillator LC loop;
   the tuner LC loop is used for receiving an electromagnetic wave signal, changing a resonance frequency through a control voltage signal of the frequency synthesizing unit to improve an intensity of a signal of a target frequency, suppressing an out-of-band signal, and outputting the signal to the low noise amplifier of the receiver;
   the reference oscillator LC loop is configured to cooperate with the frequency synthesizing unit to generate a signal having a certain relation with a target signal to determine a frequency control voltage to control the resonance frequency of the tuner LC loop; and
   the frequency synthesizing unit is configured to receive a frequency instruction from the control unit and a preset relationship between the target frequency and a reference frequency, calculate the reference frequency, and regulate a resonance of the reference oscillator to reach the reference frequency with a stable clock as a standard frequency.

In a class of this embodiment, the frequency synthesizing unit comprises a micro-processing unit, a loop filter, a phase detector, a pre-scaler and an oscillator; and the oscillator, the loop filter, the pre-scaler and the phase detector form a phase-locked loop;
   the micro-processing unit is configured to receive an instruction from the control unit to obtain target frequency information, calculate the reference frequency according to the relationship between the target frequency and the reference frequency, calculate a pre-scaled frequency value according to the relationship between the frequency of a standard clock and the reference frequency, and transmit the pre-scaled frequency value to the pre-scaler; the pre-scaler is configured to pre-scale the signal from the oscillator according to the pre-scaled frequency value and then transmit to the phase detector; the phase detector is configured to compare the signal with a standard signal from the clock, and transmit a difference signal to the loop filter; the loop filter is configured to generate a tuning voltage by using the filtered signal; one path of the tuning voltage is transmitted to the outside of the frequency synthesizing unit, and then transmitted to the tuner LC loop and the reference oscillator LC loop respectively; another path of the tuning voltage is transmitted to the micro-processing unit; and the micro-processing unit is configured to digitalize the signal and then output the signal in a digital form to control a capacitor switch array.

According to the technical solutions of the disclosure, the resonance frequency of the front-end filtering frequency selector can be accurately quickly regulated; the saturation phenomena of the LNA and the ADC are reduced; the signal-to-noise ratio and the dynamic range are improved; and the performance of the receiver is improved. Moreover, there is no need to inject the reference signal in front of the LNA, and continuous no-mute tuning can be carried out.

The technical solutions of the disclosure are convenient to implement, and high in practicality, solve the problems that the practicality of related technology is low and the actual application is not convenient, which can enhance the user experiences and have important market value.

DETAILED DESCRIPTION

According to the disclosure, front-end filtering frequency selection of a receiver is implemented through resonance. Because of high intermediate frequency or zero intermediate frequency and low intermediate frequency for direct sampling, no matter what the receiver is, a front-end filtering frequency selection system can be completely independent of a post-processing part. The implementation method is to tune according to a reference oscillating circuit. The front-end filtering frequency-selecting of the receiver aims to only allow a frequency band of a signal to be received to enter a post-stage system to perform amplification, frequency conversion, demodulation and the like. Therefore, it is actually an adjustable band-pass filter. An objective of the disclosure is to continuously control the central frequency of the band-pass filter when the system works. According to the method, a reference oscillator works at a preset frequency which has a certain relationship with the frequency to be received by the communication receiver; and then parameters (frequency to be received) of the system are transmitted to a front-end filtering frequency selector to realize accurate tuning. The certain relationship refers to a relationship between two frequencies which can be accurately converted and expressed by a formula, for example, the frequency of the reference oscillator is twice that of the frequency to be received. For example, the frequency of the reference oscillator is set to be twice, 1.5 times or ¾ times of the tuning frequency, but cannot be set to be an integer fraction of the tuning frequency generally to avoid frequency multiplication in a tuning loop. Then the frequency of the front-end filtering frequency selector is just the required tuning frequency based on a device parameter relationship between the reference oscillator and the front-end filtering frequency selector.

According to the embodiment of the disclosure, the reference frequency is preferably set to be twice of the tuning frequency.

The target frequency mentioned below is an electromagnetic wave frequency to be received, namely tuning frequency.

Figure 1:
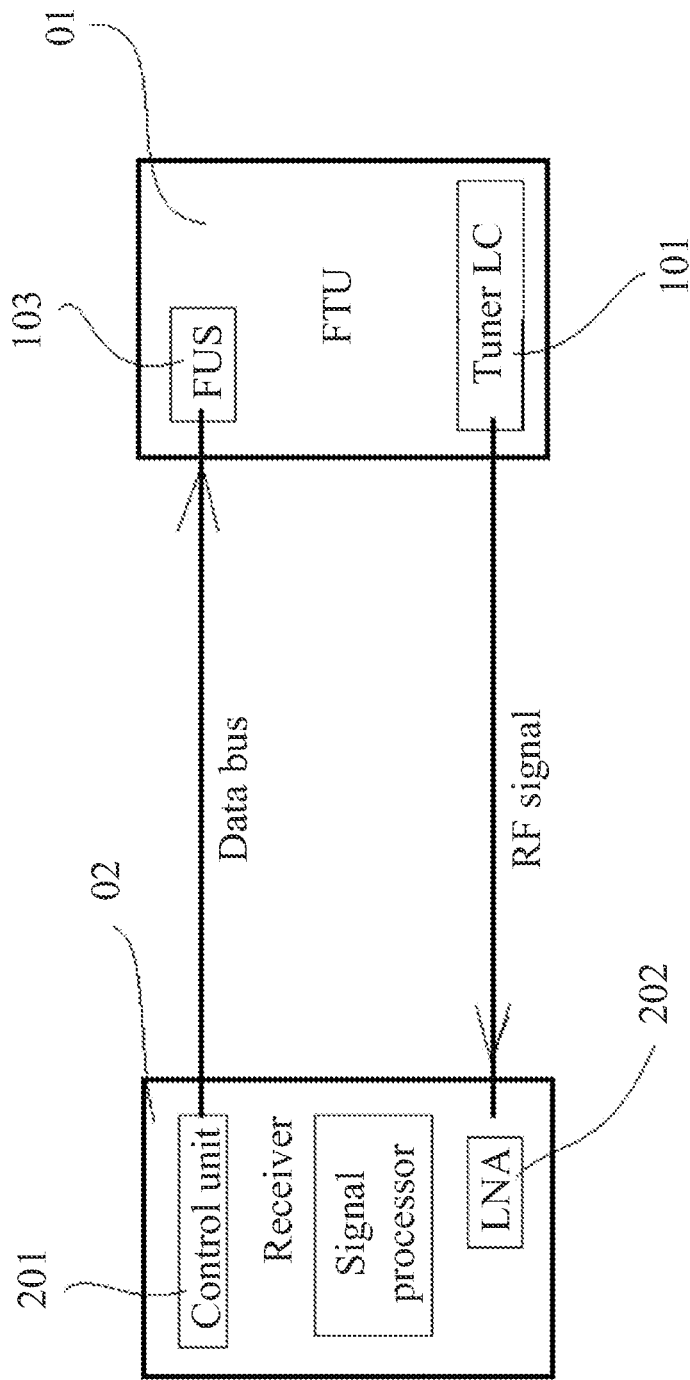
FIG. 1 is a relationship diagram of a front-end frequency selection unit 01 and a receiver 02 according to an embodiment of the disclosure.

According to the embodiment of the disclosure, the obtained relationship between a front-end frequency selection unit (FTU) 01 and a receiver 02 is shown in FIG. 1. A control unit 201 of the receiver 02 is connected with a frequency synthesizing unit (FSU) 103 in the front-end frequency selection unit (FTU) 01 through a data interface (Data BUS), and a radio frequency output signal of a tuner LC loop (Tuner LC) 101 in the front-end frequency selection unit (FTU) 01 is connected to a low noise amplifier (LNA) 202 of the receiver 02 through a radio frequency signal channel (RF Signal).

Figure 2:
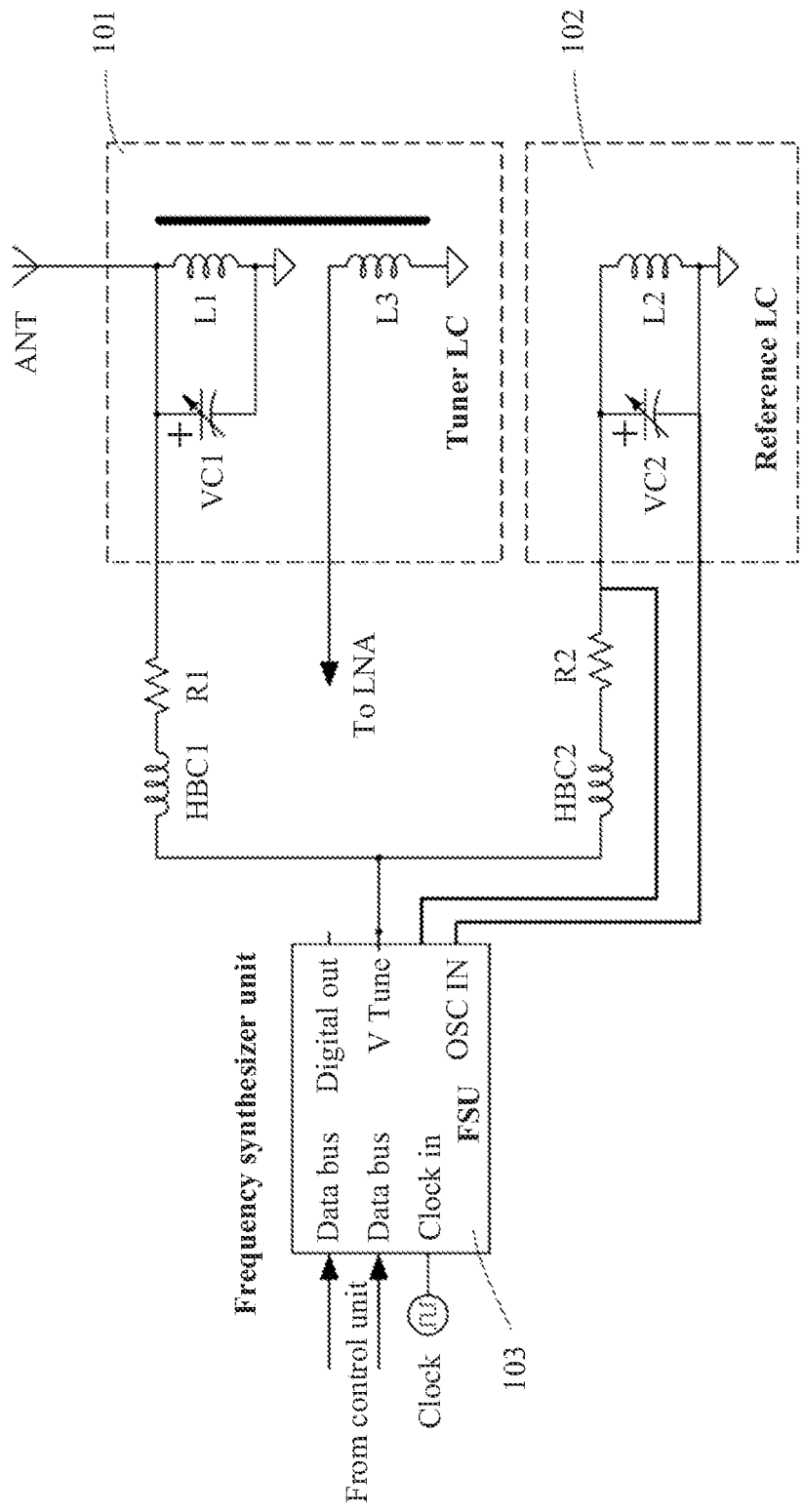
FIG. 2 is a schematic diagram of a circuit of a front-end frequency selection unit according to an embodiment of the disclosure.

A circuit shown in FIG. 2 is constructed firstly; and the front-end frequency selection unit (FTU) 01 comprises the tuner LC loop (Tuner LC) 101, a reference oscillator LC loop (Reference LC) 102 and the frequency synthesizing unit 103.

The tuner LC loop 101 (Tuner LC) is configured to receive an electromagnetic wave signal, change the resonance frequency through a control voltage signal (V Tune) of the frequency synthesizing unit (FSU) 103 to improve the intensity of a signal of the target frequency, suppress an out-of-band signal, and output the signal to the low noise amplifier (LNA) 202 of the receiver. The tuner LC loop 101 (Tuner LC) mainly comprises a tuning inductor L1, a variable capacitor VC1 and an output inductor L3. The variable capacitor VC1 is generally a variable capacitance diode or a capacitor switch array (generally a group of capacitors controlled by a field effect transistor). If the variable capacitor VC1 is the variable capacitance diode, the variable capacitor VC1 is connected to a control voltage output end (V Tune) of the frequency synthesizing unit 103 through a high frequency choke inductor HBC1 and a resistor R1. If the variable capacitor VC1 is the capacitor switch array, the variable capacitor VC1 is connected to a digital output end (Digital Out) of the frequency synthesizing unit 103. In the embodiment, the variable capacitance diode is used. The tuning inductor L1 is connected in parallel with the variable capacitor VC 1. According to the condition, the tuning inductor L1 is connected with an antenna (ANT). One end of the output inductor L3 is connected to a low noise amplifier (LNA) input end of the receiver, thereby facilitating the signal amplification, digitalization and demodulation. The L1 and the L3 are coupled through a magnetic core, thereby facilitating the transmission of a resonant signal on the L1 to the L3.

The reference oscillator LC loop 102 (Reference LC) is configured to cooperate with the frequency synthesizing unit to generate a signal having a certain relation with the target signal, so that the frequency control voltage (V Tune) is determined, and the resonance frequency of the tuner LC loop 101 can be controlled. The reference oscillator LC loop 102 (Reference LC) comprises an oscillation coil L2 and a variable capacitor VC2 which are connected in parallel. The VC2 can be a variable capacitance diode or a capacitor array.

In the embodiment, the VC2 is the variable capacitance diode and is connected to the control voltage output end (V Tune) of the frequency synthesizing unit 103 through a high-frequency choke inductor HBC2 and a resistor R2. If the VC2 is the capacitor switch array, the digital output end (Digital Out) of the frequency synthesizing unit 103 needs to be connected.

According to the LC oscillator characteristic frequency formula $f=\frac{1}{2\pi\sqrt{LC}}$, the frequency f is inversely proportional to the square root of the inductance value LC. According to the embodiment, the reference frequency is designed to be twice the target frequency, and therefore, L1=4L2 is required.

The frequency synthesizing unit 103 (FSU) is configured to receive a frequency instruction from the control unit in the receiver through the data bus, calculate the reference frequency according to the preset relationship between the target frequency and the reference frequency, and regulate the capacity of the VC2 in the reference oscillator LC loop 102 through the control voltage (V Tune) or a digital output (Digital Out) with a stable clock as a standard frequency, so that the VC2 and the L2 in the reference oscillator LC loop 102 resonate at the reference frequency. Taking V Tune output as an example, the tuner LC loop 101 and the reference oscillator LC loop 102 are controlled by the same control voltage (V Tune), so that the oscillation frequency relationship between the tuner LC loop 101 and the reference oscillator LC loop 102 depends on the relationship between the L1, the VC1, the L2 and the VC 2; and if the models and parameters of the used VC1 and VC2 are consistent, the oscillation frequency relationship between the VC1 and the VC2 completely depends on the relationship between the L1 and the L2. As described above, L1=4L2, and thus the resonance frequency of the reference oscillator LC loop 102 is always twice that of the tuner LC loop 101.

Figure 3:
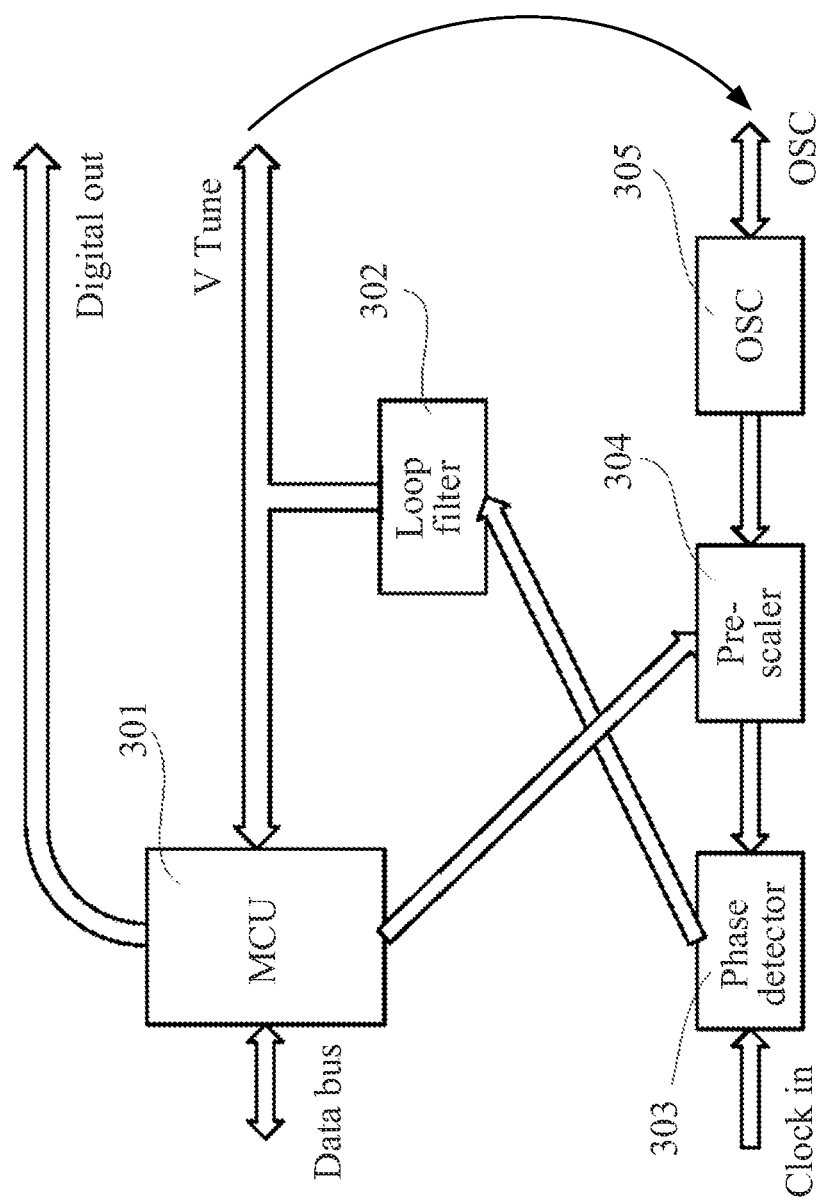
FIG. 3 is an internal structure diagram of a frequency synthesizing unit 103 according to an embodiment of the disclosure.

As shown in FIG. 3, preferably, the frequency synthesizing unit 103 in the embodiment comprises a micro-processing unit 301 (MCU), a loop filter 302, a phase detector 303, a pre-scaler 304 and an oscillator 305 (OSC). The oscillator 305, the loop filter 302, the pre-scaler 304 and the phase detector 303 form a phase-locked loop. The micro-processing unit 301 is configured to receive an instruction from the control unit to obtain target frequency information, calculate the reference frequency according to the relationship between the target frequency and the reference frequency, calculate the pre-scaled frequency value according to the relationship between the frequency of the standard frequency (clock) and the reference frequency, and transmit the value to the pre-scaler 304; the pre-scaler 304 is configured to pre-scale the signal from the oscillator 305 according to the value and transmit to the phase detector 303; the phase detector 303 is configured to compare the signal with the standard signal from the clock, and transmit the difference signal to the loop filter 302; the loop filter 302 is configured to form the tuning voltage (V Tune) from the filtered signal; one path of the tuning voltage is transmitted to the outside of the frequency synthesizing unit 103, and then is transmitted to the tuner LC loop 101 and the reference oscillator LC loop 102 (shown as a dotted line in FIG. 2) respectively; another path of the tuning voltage is transmitted to the micro-processing unit 301; and the micro-processing unit 301 is configured to digitalize the signal, and output in a digital form (Digital Out) to control the capacitor switch array.

To enable the frequency of the tuner LC loop and the frequency of the reference oscillation LC loop to precisely accord with the preset design (the relationship is 1:2 herein), the performances of the inductors L1 and L2 need to be controlled well, and VC1 and VC2 also need to be screened, so a device with the better V-C curve consistency is needed.

After the above circuit is built, accurate front-end frequency selection can be carried out:

1, firstly, the receiver 02 is configured to determine the frequency (target frequency, supposed to be 100 MHz) to be received; the control unit 201 of the receiver 02 is configured to transmit the target frequency to the frequency synthesizing unit 103 (FSU) of the front-end frequency selection unit 01 through the data bus; the micro-processing unit 301 in the frequency synthesizing unit 103 is configured to perform preset calculation on the target frequency (for example, the target frequency is multiplied by 2, namely 100*2=200 MHz); the pre-scaled frequency value is calculated according to the relationship between the reference frequency (clock, for example, 40 MHz) and the reference frequency; and the value is transmitted to the pre-scaler 304. According to the hypothesis in the above embodiment, the pre-scaled frequency value=200/40=2.5.

2, the pre-scaler 304 is configured to pre-scale the signal from the oscillator 305 according to the value and transmit to the phase detector 303; the phase detector 303 is configured to compare the signal with the standard signal from the clock and transmit the difference signal to the loop filter 302; the loop filter 302 is configured to form the tuning voltage (V Tune) from the filtered signal; one path of the tuning voltage is transmitted to the outside of the frequency synthesizing unit 103 and then is transmitted to the tuner LC loop 101 and the reference oscillator LC loop 102 (shown as a dotted line in FIG. 2) respectively; another path of the tuning voltage is transmitted to the micro-processing unit 301; and the micro-processing unit 301 is configured to digitalize the signal and output in a digital form (Digital Out) to control the capacitor switch array.

3, the VC2 in the reference oscillation circuit 102 is controlled by the V Tune, and the capacity is changed continuously, so that the oscillation frequency is stabilized at twice of the target frequency finally; the oscillation frequency is 200 MHz herein; the V Tune is also transmitted to the VC1 of the tuner LC circuit 101; the VC1 and the VC2 have the same V-C curve, so that the capacity value of the VC1 is always the same as that of the VC2, L1=4L2; and therefore, the resonance frequency of the tuner LC circuit 101 is just half of the frequency of the reference oscillation LC circuit 102 at the moment, namely, the resonance frequency is just 100 MHz of the target frequency.

4, the tuning is completed.

If the variable capacitors VC1 and VC2 in the tuner LC circuit 101 and the reference oscillation LC circuit 102 adopt the capacitor switch array, the Digital Out of the frequency synthesizing unit 103 is connected to the capacitor switch array, then the capacitor switch array can determine the capacitors connected to the LC circuit to participate in oscillation according to the numerical value of the Digital Out, and the above work can be completed as well.

It will be obvious to those skilled in the art that changes and modifications may be made, and therefore, the aim in the appended claims is to cover all such changes and modifications.

What is claimed is:

1. A method for front-end filtering frequency selection for a communication receiver, the method comprising:

1) disposing a reference oscillator working at a preset frequency associated with a frequency to be received by the communication receiver; and
2) transmitting the frequency to be received to a front-end filtering frequency selector, to realize accurate tuning; wherein, a frequency of the front-end filtering frequency selector is a required tuning frequency based on a device parameter relationship between the reference oscillator and the front-end filtering frequency selector, wherein the preset frequency of the reference oscillator is not set to be an integer fraction of the required tuning frequency, to avoid frequency multiplication in a tuning loop,
wherein the preset frequency of the reference oscillator is twice, 1.5 times or ¾ of the required tuning frequency.

2. A device for front-end filtering frequency selection for a communication receiver, the device comprising: a front-end frequency selection unit and a receiver; wherein the receiver comprises a control unit and a low noise amplifier; the front-end frequency selection unit comprises a frequency synthesizing unit and a tuner LC loop; the frequency synthesizing unit is connected to the control unit through a data interface; and a radio frequency output signal of the tuner LC loop is connected to the low noise amplifier through a radio frequency signal channel.

3. The device of claim 2, wherein
the front-end frequency selection unit further comprises a reference oscillator LC loop;
the tuner LC loop is used for receiving an electromagnetic wave signal, changing a resonance frequency through a control voltage signal of the frequency synthesizing unit to improve an intensity of a signal of a target frequency, suppressing an out-of-band signal, and outputting a signal to the low noise amplifier of the receiver;
the reference oscillator LC loop is configured to cooperate with the frequency synthesizing unit to generate a signal having a certain relation with a target signal to determine a frequency control voltage to control the resonance frequency of the tuner LC loop; and
the frequency synthesizing unit is configured to receive a frequency instruction from the control unit and a preset relationship between the target frequency and a reference frequency, calculate the reference frequency, and regulate a resonance of the reference oscillator to reach the reference frequency with a stable clock as a standard frequency.

4. The device of claim 3, wherein
the frequency synthesizing unit comprises a micro-processing unit, a loop filter, a phase detector, a pre-scaler, and an oscillator; and the oscillator, the loop filter, the pre-scaler and the phase detector form a phase-locked loop;
the micro-processing unit is configured to receive an instruction from the control unit to obtain target frequency information, calculate the reference frequency according to the relationship between the target frequency and the reference frequency, calculate a pre-scaled frequency value according to the relationship between the frequency of a standard clock and the reference frequency, and transmit the pre-scaled frequency value to the pre-scaler;
the pre-scaler is configured to pre-scale a signal from the oscillator according to the pre-scaled frequency value and then transmit to the phase detector;
the phase detector is configured to compare the signal with a standard signal from the standard clock, and transmit a difference signal to the loop filter;
the loop filter is configured to generate a tuning voltage by using a filtered signal; one path of the tuning voltage is transmitted to outside of the frequency synthesizing unit, and then transmitted to the tuner LC loop and the reference oscillator LC loop respectively; another path of the tuning voltage is transmitted to the micro-processing unit; and
the micro-processing unit is configured to digitalize a signal of the another path of the tuning voltage and output the signal of the another path of the tuning voltage in a digital form to control a capacitor switch array.

\* \* \* \* \*